United States Patent
Jenkins, Jr.

[11] Patent Number: 5,918,896
[45] Date of Patent: Jul. 6, 1999

[54] SELF LOCKING CHAIN DEVICE

[76] Inventor: William O. Jenkins, Jr., 353 Lakebend Dr., Brandon, Miss. 39042

[21] Appl. No.: 08/822,826

[22] Filed: Mar. 24, 1997

[51] Int. Cl.[6] .................................................. B62D 53/10
[52] U.S. Cl. ........................................ 280/457; 280/480
[58] Field of Search ................................ 280/457, 477, 280/480, 504, 507, 514, 511

[56] References Cited

U.S. PATENT DOCUMENTS

| | | | |
|---|---|---|---|
| 2,937,885 | 5/1960 | Skow | 280/457 |
| 3,125,355 | 3/1964 | Snuggins | 280/457 |
| 3,132,878 | 5/1964 | De Puydt et al. | 280/457 |
| 3,464,720 | 9/1969 | Abromauage | 280/457 |
| 3,827,722 | 8/1974 | Miller | 280/432 |
| 3,858,908 | 1/1975 | Frank | 280/476 |
| 3,869,148 | 3/1975 | Iehl | 280/457 |
| 4,077,348 | 3/1978 | Broehl | 114/200 |
| 5,127,219 | 7/1992 | Herron | 59/93 |
| 5,356,189 | 10/1994 | Fujita | 294/82.11 |
| 5,476,281 | 12/1995 | Worthington | 280/507 |
| 5,566,965 | 10/1996 | Applegate | 280/500 |

*Primary Examiner*—Lanna Mai
*Assistant Examiner*—Avraham H. Lerner

[57] ABSTRACT

A self locking chain device for locking a chain to a vehicle comprises an elongated cross bar having an upwardly extending arm attached to each end thereof. Each arm comprises first and second arbors which define a receiving slot for receiving a first interior link of a chain and configured in such a manner to enable two adjacent contiguous links to lock the interior link therein. Both first and second arbors are provided with cusps or projections for limiting passage of the chain link to and from the receiving slot. The first arbor also is provided with a concavity. A second contiguous or selected link, serving as a locking link, is slid over and down the first arbor and to the concavity, thereby double locking the first interior link since the opening between the cusps or projections is less than the combined diameter of the interior link and locking link. In this manner, the device effectively double locks the chain, prohibiting exit of the interior link without first removing the locking link from the first arbor.

6 Claims, 4 Drawing Sheets

SELF LOCKING CHAIN DEVICE

BACKGROUND

1. Field of Invention

The present invention relates to attaching and locking chains; specifically to providing an improved attachment of trailer safety chains to towing vehicles.

2. Description of Prior Art

Safety chains for trailers are required by law. Attaching the trailer safety chains to a towing vehicle has become a universal problem, partly because the majority of the step bumpers produced today do not allow for the attachment of safety chains. The owner must attach the chain using the common weak "S" hook to some part of the undercarriage or improvise an attachment in the existing holes designated for the trailer ball. Attachment of the safety chain to the trailer ball is illegal in most states. Safety is compromised because the weak "S" hook typically bounces out of the attachment hole, or straightens out and fails under stress.

Exemplary is U.S. Pat. No. 5,566,965, issued to John M. Applegate on Aug. 21, 1995, which uses the shaft of a trailer ball for attachment and two holes for hanging the common weak "S" hook.

Unlike Mr. Applegate's patent, the present invention does not use the ball shaft for attachment and eliminates the weak "S" hook attachment; plus double self locks selected links of a chain for maximum safety.

U.S. Pat. No. 5,127,219 issued to Maynard M. Herron, and D. John Schroeder on Dec. 14, 1990, discloses a U-shaped hook incorporating an L-shaped movable wire for latching chain.

Unlike Mr. Herron's patent, the present invention double self locks itself with no moving parts, by using its own links.

U.S. Pat. No. 3,464,720 issued to John C. Abromauage, and Edward A. Frader on Oct. 9, 1967, discloses a locking clasp for attachment to a specific commercial bumper.

Unlike Mr. Abromauage's patent, the present invention is universal; bolts to all vehicles step bumper.

No single device in the prior art shows all the features of the present invention.

OBJECTS AND ADVANTAGES

Accordingly, besides the objects and advantages of the double self locking safety chain device described previously, several additional objects and advantages of the present invention are:

(1) To provide safety for our loved ones, by not using the common weak "S" hook for attachment;

(2) To provide extra strength to a bumper for safety, by virtue of the ⅜" structural steel body, double bolted to the horizontal attachment area of said bumper;

(3) To provide the locking of any link of a chain, "to allow no more slack than necessary to permit proper turning" (as required by law);

(4) To allow both safety chains to be crossed under the tongue of the trailer thereby adjusting unnecessary slack, and then locking the selected links to "prevent the tongue from dropping to the ground" (as required by law);

(5) To create a 3-point hitch, since the structural steel apparatus is stronger than the trailer ball and shaft;

(6) To provide improved elements and arrangements thereof in an apparatus for the purpose described for safety and convenience, which is inexpensive, dependable and wholly effective in accomplishing its intended purposes.

Still further objects and advantages will become apparent from a consideration of the ensuing description and photographs.

Figure 1:
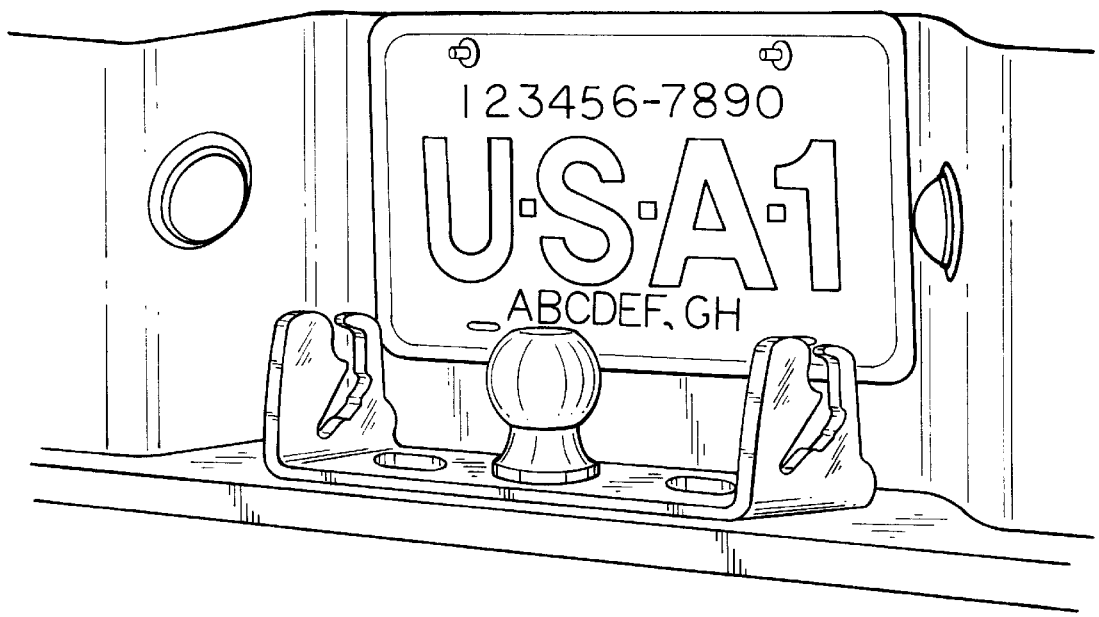
FIG. 1 is a ¼ angle front environmental view of present invention.

| REFERENCE NUMERALS OF PHOTOGRAPHS | |
|---|---|
| 10 - Arbor | 24 - Body |
| 12 - Cusp | 26 - Bolt Slot |
| 14 - Concave | 28 - Ball Shaft Hole |
| 16 - Recessed Bed | 46 - Selected Interior Link |
| 18 - Receiving Slot | 48 - Selected Locking Link |

DETAILED DESCRIPTION OF THE PREFERRED EMBODIMENT

The environmental view of FIG. 1 shows the present invention is universal, and mounts to all vehicles step bumper. The embodiment of a self locking mechanism of the present invention is illustrated in FIGS. 4, 5, 6 and 7.

Figure 2:
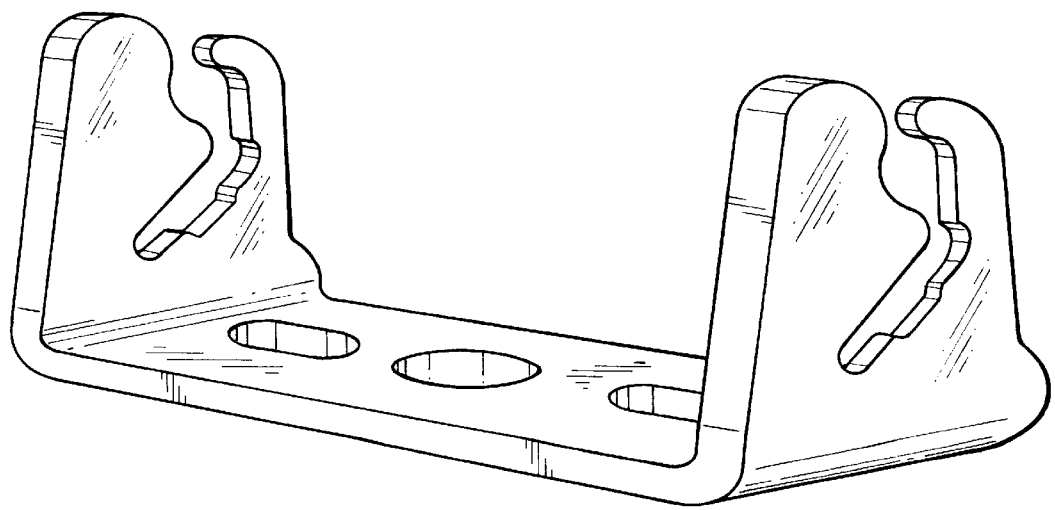
FIG. 2 is a ¼ angle front view of present invention.

FIG. 2, shows a ¼ angle front view of the present invention.

Figure 3:
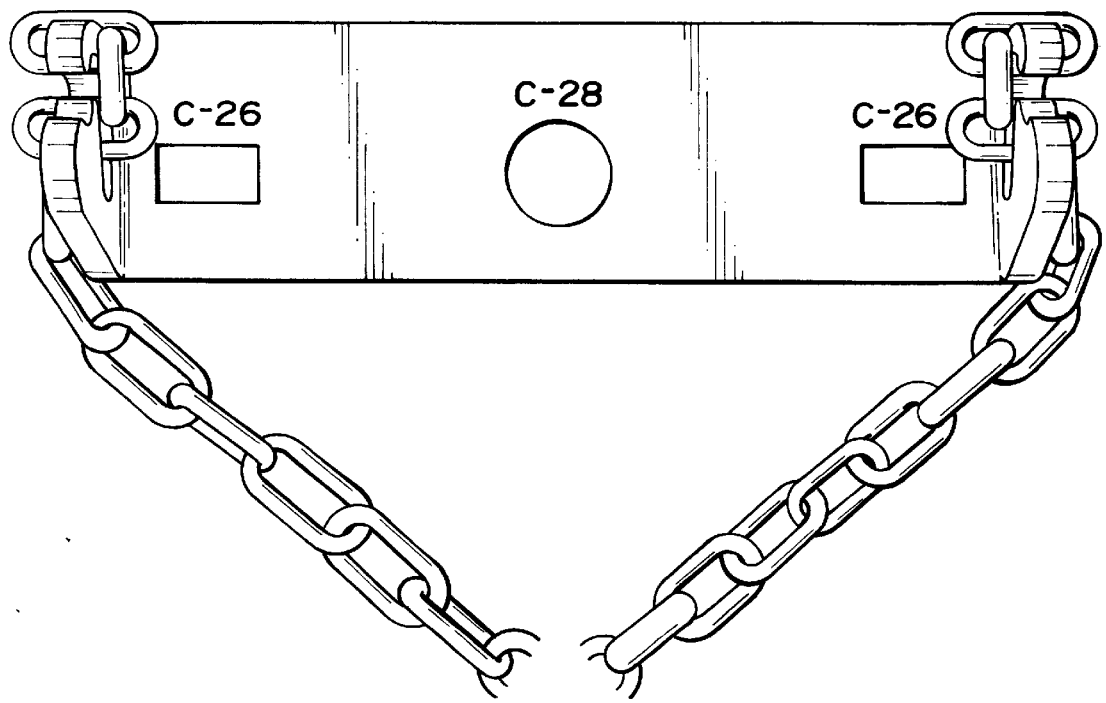
FIG. 3 Is a full top view of present invention.

FIG. 3 Shows top view of the device comprising an elongated cross bar having two rectangle ¾" slots (C-26) designed to bolt to both types of step bumpers (4" center to center and 4½" center to center). and a 1¼" hole (C-28) which accepts all size trailer ball shafts (¾" to 1¼"). The apparatus is made from a single piece of ⅜" (A-36) structural steel (36,000 lb. yield point psi).

Figure 4:
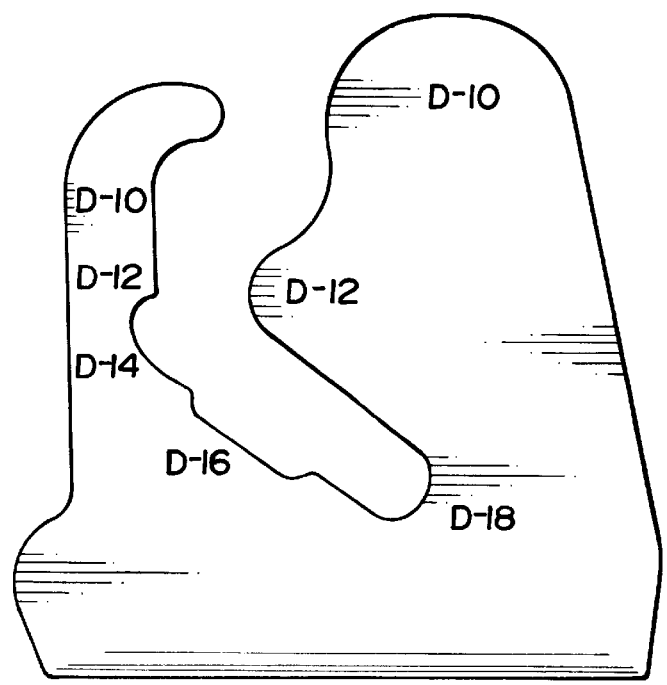
FIG. 4 is a full side view of present locking mechanism.

The double self locking configuration is specifically designed to accept all manufacturers safety chains. As shown in FIG. 4, the device further comprises two upwardly extending arms attached to each end of said elongated cross bar having arbors or shafts (D-10) which are curvious for easy acceptance of an interior link into a receiving slot (D-18). A recessed bed (D-16) allows for various size links to be accepted. First and second cusps or projections (D-12) are provided for restricting a predetermined passage size to and from said slot (D-18). A concave (D-14) is provided in the first cup for locking a first interior link, by sliding a second contiguous or thereafter selected link referred to as the locking link, over the first cusp and to the concave (D-14)

Figure 5:
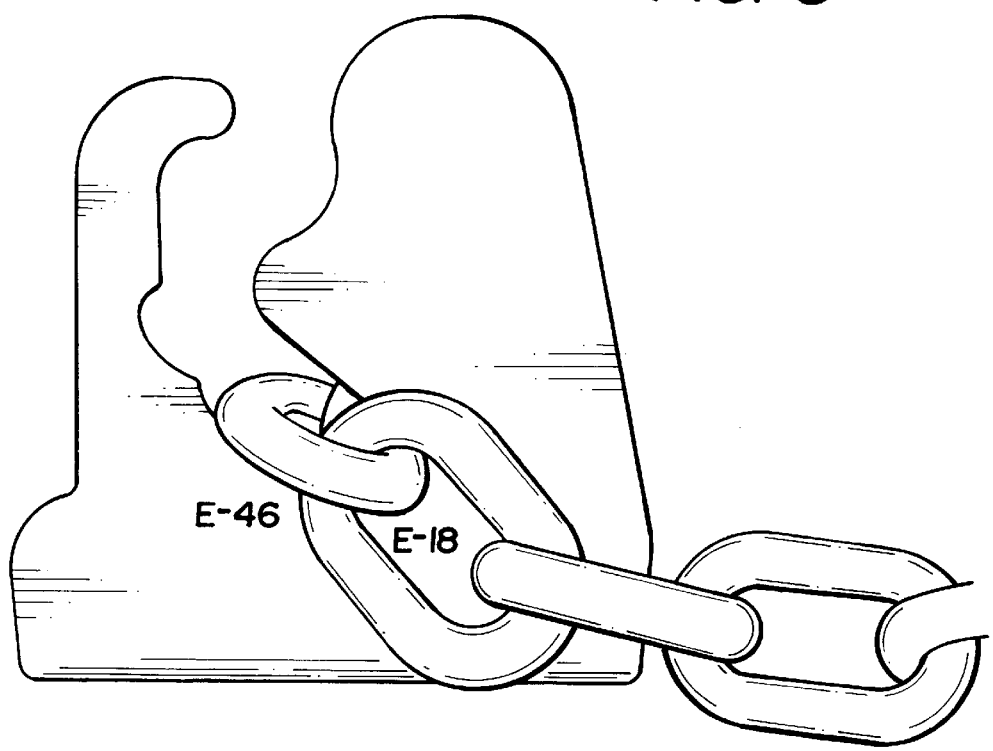
FIG. 5 is a full side view of present locking mechanism with a selected interior link of a chain in the locked position.

The self locking of a chain is accomplished by as shown in FIG. 5 by inserting an interior selected link (E-46) into said slot (E-18) from outside to inside which locks said interior link via the two adjacent contiguous links on each side of said selected interior link.

Figure 6:
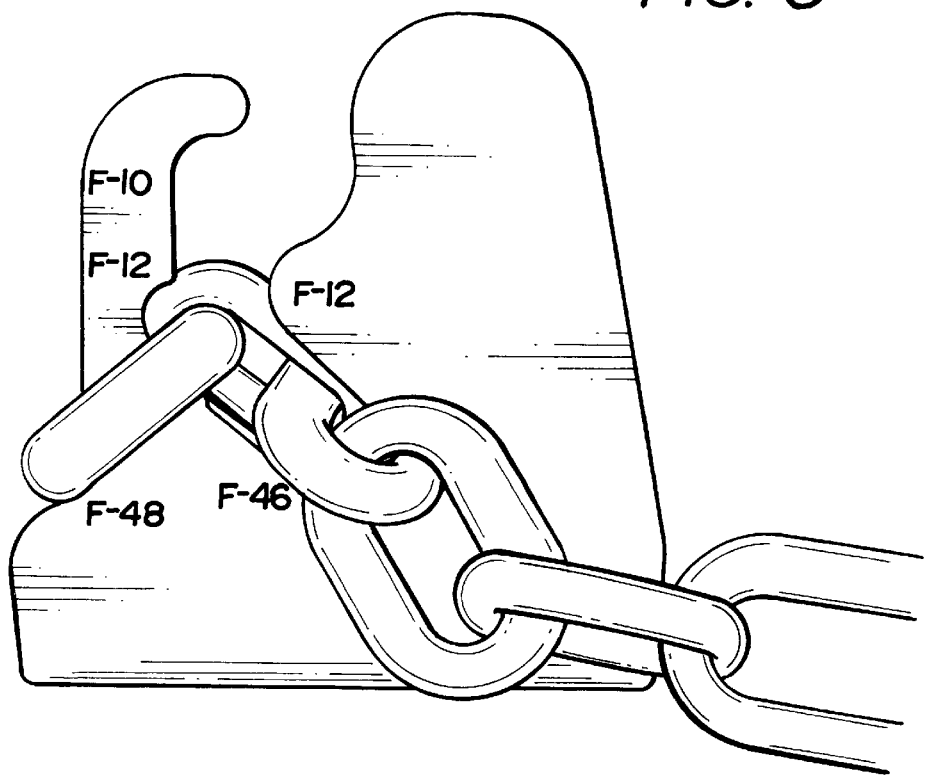
FIG. 6 is a full side view of present locking mechanism with said interior link double locked by a selected locking link.

Double self locking as shown in FIG. 6 is accomplished by using a second contiguous or thereafter selected link, as said locking link (F-48), inserting the selected locking link over the small arbor (F-10) and sliding the selected link over and down cusp (F-12) which prohibits said interior link (F-46) from exiting because said predetermined clearance between the two cusps (F-12) is smaller than the size of the diameter of the two links combined (F-46 and F-48), thus prohibiting the exit of said interior link (F-46), without first removing said selected locking link (F-48) from the arbor (F-10).

Figure 7:
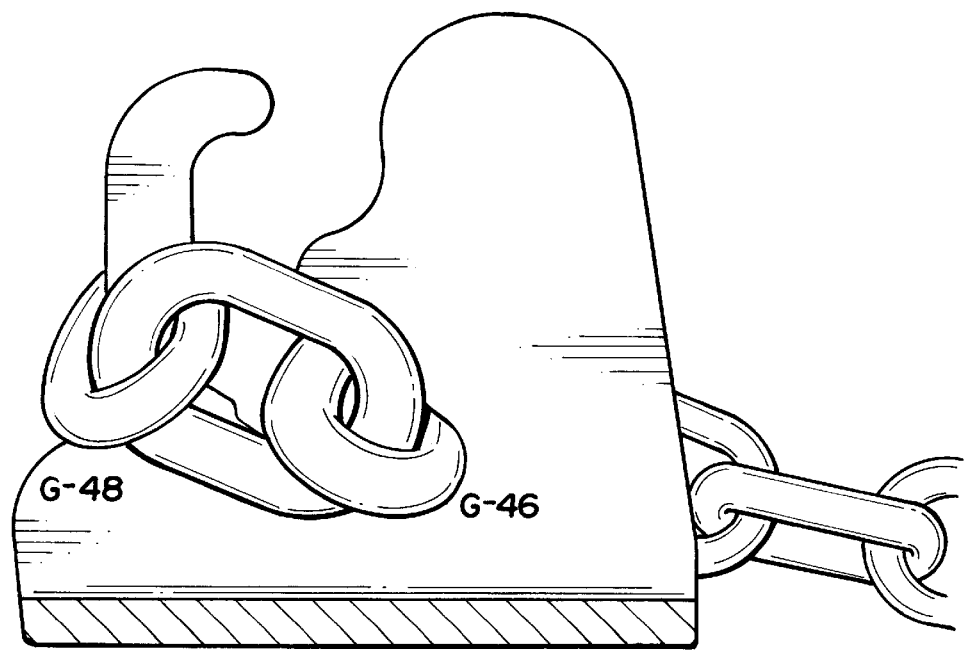
FIG. 7 is a full inside view of present locking mechanism with said interior link double locked by said selected locking link.

FIG. 7, shows a full inside view of said locking mechanism, with said interior link (G-46) locked in by said locking link (G-48).

Figure 8:
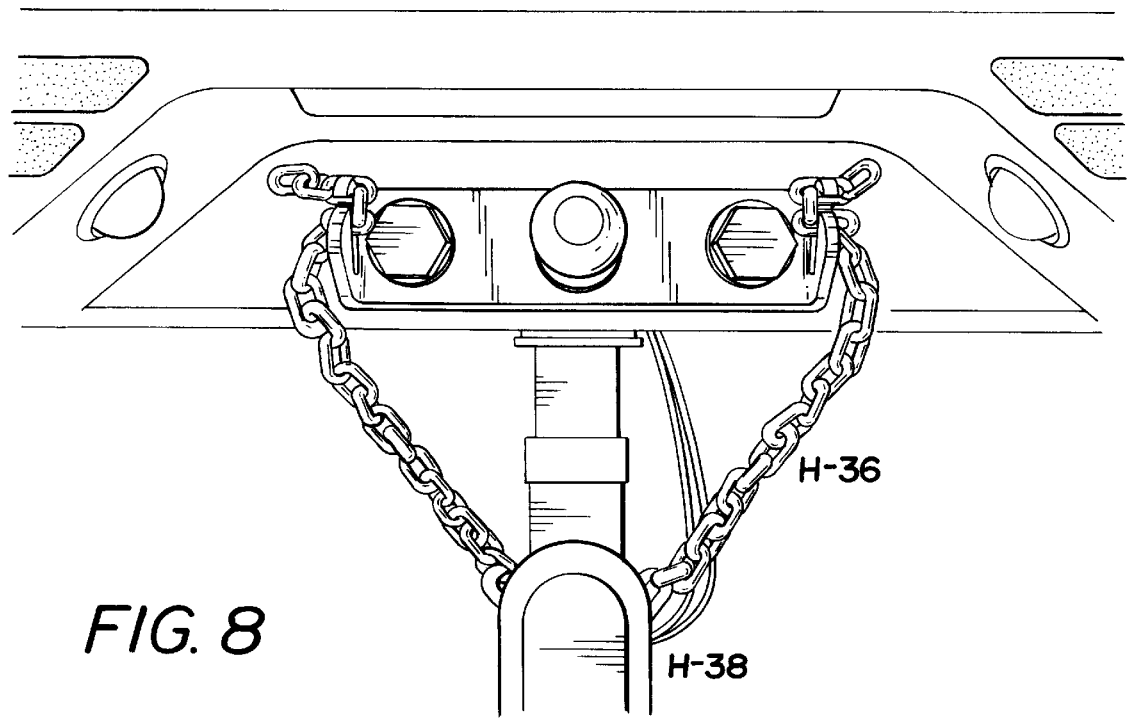
FIG. 8 is a top environmental view of present invention with a trailer tongue and the safety chains locked.

FIG. 8, shows a top view of present invention in the environmental position, with a trailer tongue (H-38) and safety chains (H-36) locked.

SUMMARY, RAMIFICATIONS, AND SCOPE

Accordingly, the reader will see that this invention is very important to the safety of our loved ones in that when the trailer detaches from a towing vehicle, the present invention shall double lock the safety chains while not allowing the tongue to oscillate violently or drop to the ground, and guarantee the lock (until the yield of a specific chain) and not rely on a common weak "S" hooks.

Furthermore, the double self locking apparatus has additional advantages in that It is excellent for locking chains for chain towing and lifting It strengthens the bumper It is very attractive and inexpensive Although the previous descriptions contain many specificities, these should not be construed as limiting the scope of present invention but as merely providing illustrations of some of the presently preferred embodiments of present invention. For example, the present locking mechanism can have other shapes, such as circular, oval, trapezoidal, triangular, etc., the slot, arbor, and cusp can have different shapes or configurations, etc.

Thus the scope of present invention should be determined by the appended claims and their legal equivalents, rather than by the examples given.

I claim:

1. A self locking chain device comprising (a) an elongated cross bar having first and second ends; and (b) two upwardly extending arms attached to said first and second ends respectively, each of said arms comprising first and second arbors which define a receiving slot, said receiving slot being configured in such a manner to receive a first interior link of a chain, said first arbor having a concave configured in such a manner to engage a second link of a chain, wherein, when said first interior link is placed within said receiving slot, the two links adjacent and contiguous to said first interior link lock said first interior link within said receiving slot, and wherein, when said second link of a chain is slid over said first arbor and engages said concave, said first interior link is locked between said first and second arbors until said second link is removed from said first arbor.

2. The self locking chain device in accordance with claim 1, wherein each of said first and second arbors is provided with a cusp, each of said cusps being configured in such a manner that passage between said arbors from and to said receiving slot is limited to one chain link.

3. The self locking chain device in accordance with claim 1, wherein said elongated cross bar is provided with a centrally disposed hole configured in such a manner for engaging a ball hitch of a vehicle and with a pair of bolt holes for mounting the device to a vehicle step bumper.

4. A self locking chain device comprising (a) an elongated cross bar having first and second ends; and (b) two upwardly extending arms attached to said first and second ends respectively, each of said arms comprising first and second arbors which define a receiving slot, said receiving slot being configured in such a manner to receive a first interior link of a chain, each of said first and second arbors having a cusp, and said first arbor having a concave configured in such a manner to engage a second link of a chain, wherein, when said first interior link is placed within said receiving slot, the two links adjacent and contiguous to said first interior link lock said first interior link within said receiving slot, and wherein when said second link of a chain is slid over said first arbor cuff and engages said concave, said first interior link is locked between said first and second arbors until said second link is removed from said first arbor.

5. The self locking chain device in accordance with claim 4, wherein said elongated cross bar is provided with a centrally disposed hole configured in such a manner for engaging a ball hitch of a vehicle and with a pair of bolt holes for mounting the device to a vehicle step bumper.

6. A device for locking a chain to a vehicle, the device comprising:

(a) an elongated cross bar having a ball shaft hole for engaging a ball hitch and a pair of bolt holes mounting the device to a vehicle bumper;

(b) two upwardly extending ends attached to said cross bar, said ends each comprising first and second arbors having respective cusps and separated by a slot adapted to receive a first interior link of the chain, said first arbor including a concave adapted to engage a second link of the chain;

wherein, when said second link is placed over said first arbor cusp and is seated in said concave, said interior link is operationally locked between said two upwardly extending ends until said second link is removed from said arbor cusp.

* * * * *